United States Patent [19]

Hayashi et al.

[11] Patent Number: 4,673,221
[45] Date of Patent: Jun. 16, 1987

[54] BRAKING SYSTEM FOR VEHICLES

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 741,904

[22] Filed: Jun. 6, 1985

[30] Foreign Application Priority Data

Jun. 7, 1984 [JP] Japan ................................ 59-117282

[51] Int. Cl.$^4$ .............................................. B60T 8/02
[52] U.S. Cl. ................................. 303/6 R; 188/106 P; 188/344; 188/345; 303/6 C; 303/84 R; 303/115; 303/116; 303/6 A
[58] Field of Search ................... 188/344, 181 A, 345, 188/71.5, 106 A, 347–360, 181 T, 72.5, 72.2; 303/113–119, 61–63, 68–69, 6 A, 84 A

[56] References Cited

U.S. PATENT DOCUMENTS

| | | | |
|---|---|---|---|
| Re. 31,387 | 9/1983 | Bayliss | 303/115 |
| 2,818,244 | 12/1957 | Ropar | 264/1 |
| 2,920,924 | 1/1960 | Reswick et al. | 303/24 |
| 3,046,060 | 7/1962 | Stager et al. | 303/21 |
| 3,403,761 | 10/1968 | Rockwell | 188/265 |
| 3,667,816 | 6/1972 | Harned | 303/21 |
| 3,731,767 | 5/1973 | Lefort | 188/72.2 |
| 3,829,166 | 8/1974 | von Loewis et al. | 303/21 CG |
| 4,036,331 | 7/1977 | Hayashi et al. | 188/187 |
| 4,046,427 | 9/1977 | Baynes et al. | 303/115 |
| 4,050,748 | 9/1977 | Belart | 303/115 |
| 4,239,294 | 12/1980 | Burgdorf | 188/344 |
| 4,260,201 | 4/1981 | Farr | 188/181 A |
| 4,274,518 | 6/1981 | Berisch | 188/344 |
| 4,281,881 | 8/1981 | Mekosh et al. | 303/99 |
| 4,289,359 | 9/1981 | Lüpertz et al. | 188/344 |
| 4,340,258 | 7/1982 | Farr | 303/115 |
| 4,350,396 | 9/1982 | Mortimer | 303/115 |
| 4,353,440 | 10/1982 | Farr | 188/181 A |
| 4,354,715 | 10/1982 | Farr et al. | 303/116 |
| 4,355,849 | 10/1982 | Wilson | 303/116 |
| 4,365,538 | 12/1982 | Andoh | 91/1 |
| 4,377,221 | 3/1983 | Farr | 188/181 A |
| 4,381,049 | 4/1983 | Crossman | 188/72.7 |

(List continued on next page.)

FOREIGN PATENT DOCUMENTS

| | | |
|---|---|---|
| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 2069642 | 8/1981 | United Kingdom ........... 188/181 A |
| 2069641A | 8/1981 | United Kingdom . |
| 2070166A | 9/1981 | United Kingdom . |
| 2109494 | 6/1983 | United Kingdom . |

OTHER PUBLICATIONS

SAE Technical Series 830484, pp. 1–8, "Performance of Antilock Brakes with Simplified Control Techniques", by Makoto Satoh & Shuji Shiraishi, 1983.
SAE Section 5: Technical Sessions, pp. 903–909, "Performance of a Simplified Control Technique for Antilock Brakes", by Makoto Satoh & Shuji Shiraishi, 1983.

Primary Examiner—Douglas C. Butler
Attorney, Agent, or Firm—Lyon & Lyon

[57] ABSTRACT

A braking system employing an antilock device which has two brake actuating mechanisms responsive to input hydraulic pressure through the antilock device. Valves are provided in the control mechanism for a second brake actuating mechanism which provide hydraulic cylinders for controlling the brake mechanism. The hydraulic cylinder of such a valve is vented until the controlling hydraulic system reaches a minimum pressure level. This pressure level is determined to be above that of the residual pressure level of the antilock mechanism. In a first embodiment, direct hydraulic control is provided to the multiple brake actuating mechanisms. In the second preferred embodiment, the reaction force to braking of the first brake actuating mechanism controls the brake pressure through a second master cylinder to the second brake actuating mechanism.

11 Claims, 9 Drawing Figures

U.S. PATENT DOCUMENTS

| | | | |
|---|---|---|---|
| 4,381,125 | 4/1983 | Wilson | 303/116 |
| 4,387,934 | 6/1983 | Farr | 303/115 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,421,359 | 12/1983 | Hayashi et al. | 303/6 A |
| 4,422,695 | 12/1983 | Farr | 303/115 |
| 4,428,624 | 1/1984 | Farr | 303/116 |
| 4,456,309 | 6/1984 | Rath | 303/10 |
| 4,457,563 | 7/1984 | Farr | 303/92 |
| 4,465,322 | 8/1984 | Hayashi | 303/6 A |
| 4,474,413 | 10/1984 | Farr | 303/116 |
| 4,494,800 | 1/1985 | Hayashi | 303/6 A |
| 4,564,244 | 1/1986 | Reinartz et al. | 303/6 C |

BRAKING SYSTEM FOR VEHICLES

BACKGROUND OF THE INVENTION

The field of the present invention is braking systems employing antilock devices for vehicles.

Braking systems have been developed which are capable of braking a wheel very efficiently without locking the wheel during braking. Such systems have employed a master cylinder, a wheel brake hydraulically coupled with the master cylinder, a sensor for sensing angular deceleration of the associated wheel capable of specifically sensing the rapid deceleration which would occur at the onset of a locked condition and a modulator in the hydraulic coupling between the master cylinder and the wheel brake which is controlled by the sensor. When the onset of a locked condition is sensed, the sensor causes the modulator to reduce the hydraulic pressure to the brake.

One such braking system is disclosed as an example in Japanese Patent Publication No. 89447/1983 and is presently well known. A modulator of such a device consists generally of an input hydraulic pressure chamber connected to an output port of a master cylinder, an output hydraulic pressure chamber connected to an input port of a wheel brake, a valve port communicating the input and output hydraullic chambers with each other, a valve body capable of opening and closing the valve port, a valve spring urging the valve body to the closed position and a spring biased piston in the output hydraulic chamber for varying the volume thereof. The piston acts to control the valve body and the valve port thereby. the spring on the piston urges the piston in such a way as to reduce the volume of the output hydraulic chamber and to open the valve port. A control hydraulic chamber also opposes pressure in the output hydraulic chamber. A hydraulic pump is connected to the control hydraulic chamber for pressurizing the control hydraulic chamber. A pressure discharge valve is also coupled with the control hydraulic chamber such that it may be opened when the mechanism senses the onset of a locked condition.

In such systems as the one described above, the spring biased piston acting on the output hydraulic chamber will create a residual pressure because of the spring biasing even though the hydraulic pressure is being modulated through pressure discharge in the control hydraulic chamber. Thus, even under conditions of initial wheel locking, hydraulic pressure to the brakes is experienced because of the spring associated with the piston in the output hydraulic chamber. Because of this condition, maximum antilock performance may not be realized on a road surface having a very low coefficient of friction.

SUMMARY OF THE INVENTION

The present invention is directed to the provision of an antilock brake system for a vehicle wheel which exhibits a smaller ratio of braking force to hydraulic force for small hydraulic pressurees than for large hydraulic pressures. In this way, the braking force associated with the residual hydraulic pressure from the antilock brake mechanism is minimized while greater braking force is available at hydraulic pressures which are higher than the residual pressure.

To accomplish the foregoing, mechanisms are contemplated which employ multiple brake actuating mechanisms responsive to an input braking action. One of the two brake actuating mechanisms is preferably disabled through pressure relief or other means until the controlling hydraulic fluid pressure is above that of the residual pressure resulting from the spring bias piston in the modulator mechanism. Through such a device, only a portion of the brake actuating mechanisms perform braking at hydraulic pressures below the residual level. At controlling hydraulic pressures above the residual level, all of the brake actuating mechanisms may be employed to increase the ratio of braking force to controlling hydraulic pressure.

Accordingly, it is a principal object of the present invention to provide an improved brake system for the wheel of a vehicle having an antilock mechanism. Other and further objects and advantages will appear hereinafter.

DETAILED DESCRIPTION OF THE PREFERRED EMBODIMENT

The embodiment of the present invention which are used as the braking system for a front wheel of a motorcycle will now be described with reference to the drawings.

Figure 2:
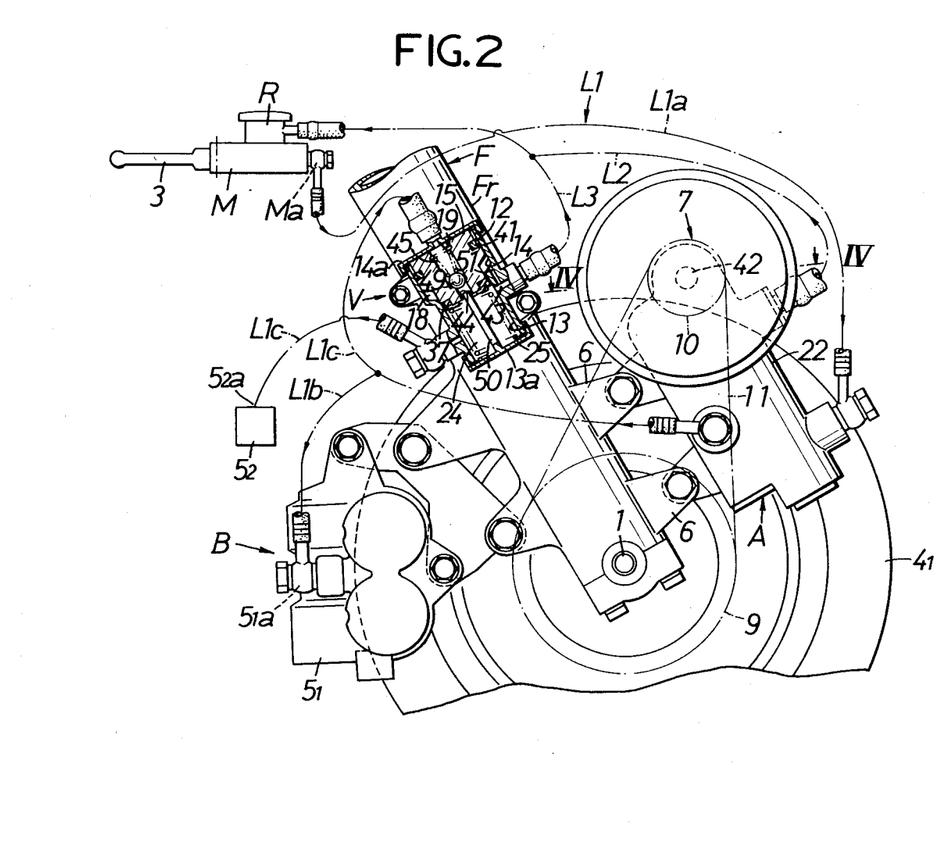
FIG. 2 is a sectional side elevation view of a first embodiment of the present invention with the hydraulic line schematically illustrated.
Figure 3:
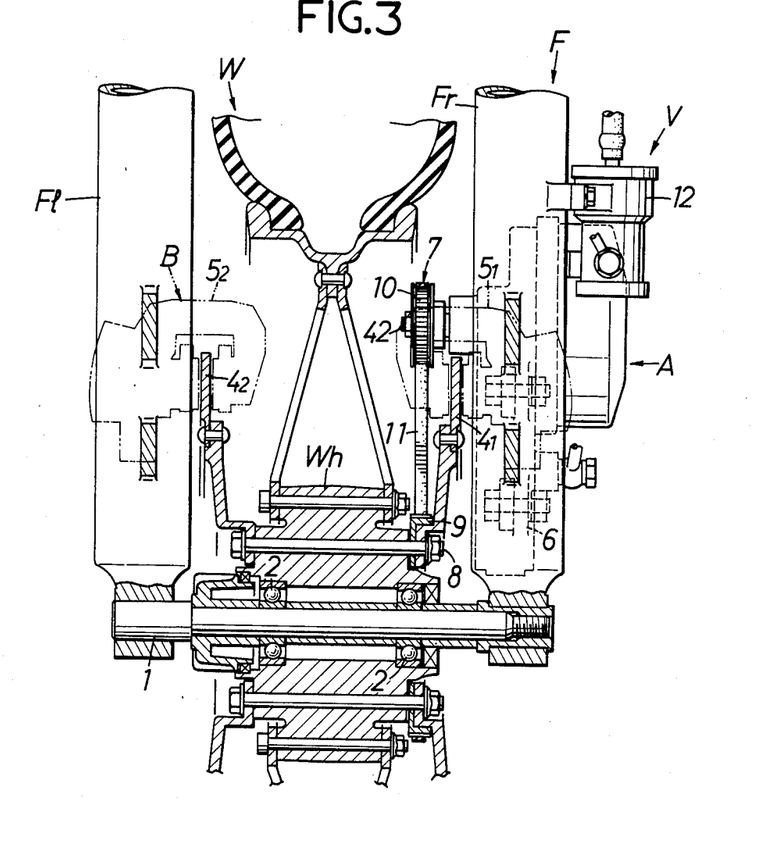
FIG. 3 is a sectional rear elevation of the mechanism illustrated in FIG. 2.

First, the present invention will be described with reference to a first embodiment shown in FIGS. 1-7. Referring to FIGS. 2 and 3, an axle 1 is connected fixedly to the lower ends of left and right fork members Fl, Fr which constitute a front fork F of a motorcycle. A hub Wh for a front wheel W is supported on the axle 1 via left and right bearings 2, 2.

A braking system for the front wheel W includes a master cylinder M attached to a steering handle (not shown), and a wheel brake B which is operated by hydraulic pressure from an output port Ma of the master cylinder M. The master cylinder M is operated by a brake lever 3.

The wheel brake B consists of first and second brake discs $4_1$, $4_2$ joined fixedly to the left and right ends of the hub Wh. First and second brake calipers $5_1$, $5_2$ are supported on the left and right fork members Fl, Fr and extend over the outer circumferential portions of the brake discs $4_1$, $4_2$ so that the calipers $5_1$, $5_2$ can hold the brake discs $4_1$, $4_2$ forcibly from both sides thereof. These brake calipers $5_1$, $5_2$ are actuated when a hydraulic pressure is supplied to their respective input ports $5_{1a}$, $5_{2a}$, to hold the corresponding brake discs $4_1$, $4_2$ forcibly from both sides thereof, whereby the braking force can be applied to the front wheel W.

Figure 1:
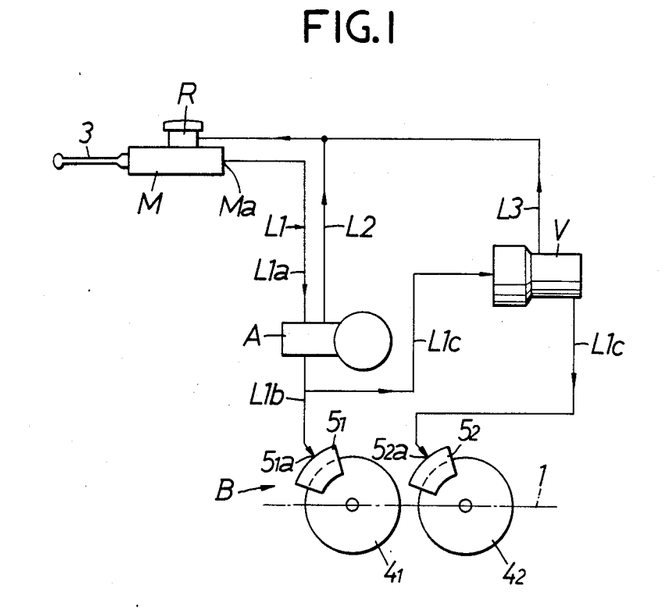
FIG. 1 is a schematic view of a first embodiment of the present invention.

As shown clearly in FIG. 1, the output port Ma of the master cylinder M and the input port $5_{1a}$ of the first brake caliper $5_1$ are connected via a hydraulic pipe $L_1$. An antilocking control unit A is provided in an intermediate portion of the hydraulic pipe $L_1$. Therefore, the hydraulic pipe $L_1$ is divided into an upstream pipe member $L_{1a}$ connecting the master cylinder M and the antilocking control unit A together, and a downstream pipe member $L_{1b}$ connecting the antilocking control unit A and the first brake caliper $5_1$ together.

A second downstream pipe member $L_{1c}$ extending to an input port $5_{2a}$ of the second brake caliper $5_2$ is branched from the downstream pipe member $L_{1b}$, and control valve V is provided in an intermediate portion of the downstream pipe member $L_{1c}$. Return pipes $L_2$, $L_3$ extending from the antilocking unit A and control valve V, respectively, are both connected to an oil tank R which is joined to the upper side of the master cylinder M. The oil tank R may be provided in some cases as a separate structure from the master cylinder M.

Referring again to FIGS. 2 and 3, a casing 22 of the antilocking control unit A is supported on upper and lower lugs 6, 6 projecting from the front surface of one fork member Fr. A driving shaft 42 in the control unit A is connected to a front wheel W via a transmission gear 7. This transmission gear 7 consists of a toothed drive pulley 9 fastened to one end surface of the hub Wh for the front wheel W by a bolt 8 with the first brake disc $4_1$. Toothed driven pulley 10 is mounted fixedly on the driving shaft 42, and a toothed belt 11 is wrapped around these two pulleys 9, 10. A gear ratio of the toothed pulleys 9, 10 is set selectively so that the driven pulley 10 is driven faster than the driving pulley 9.

Figure 4:
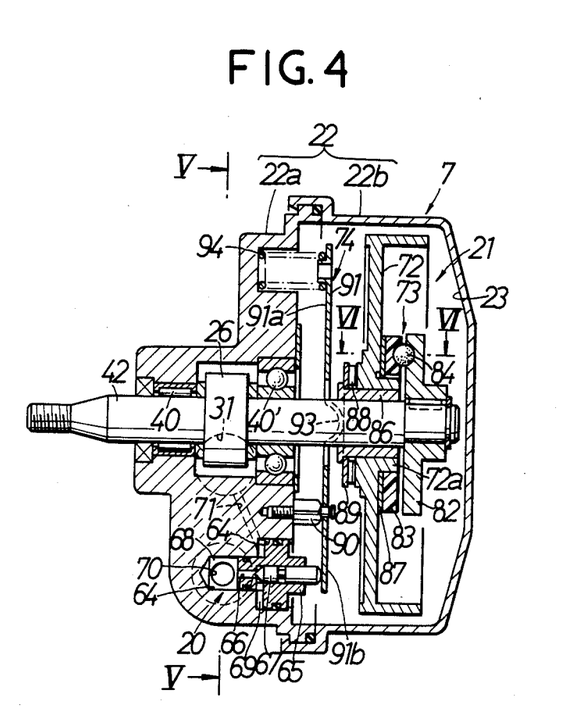
FIG. 4 is a cross-sectional view taken along line IV—IV of FIG. 2.
Figure 5:
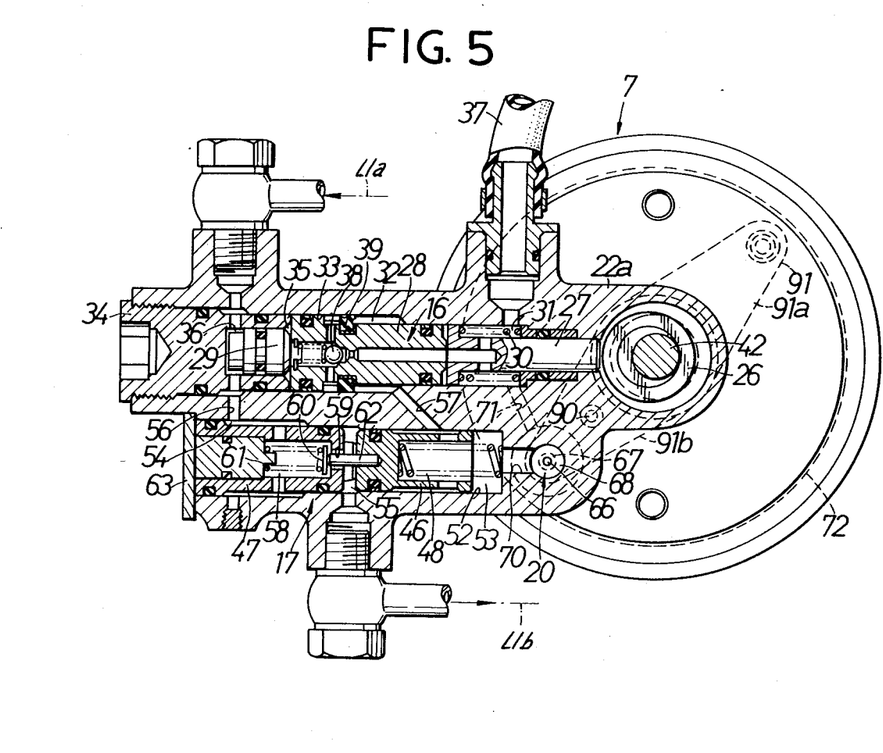
FIG. 5 is a cross-sectional view taken along line V—V of FIG. 4.

As shown in FIG. 4 and 5, the casing 22 of the antilock control unit A consists of a casing body 22a on which the driving shaft 42 is supported rotatably via bearings 40, 40'. A cup-shaped cover 22b is fitted around one end of the casing body 22a to define a sensor chamber 23 therebetween. The casing 22 is provided therein with a hydraulic pump 16, a modulator 17, a pressure discharge valve 20 and an inertial sensor 21 for sensing the angular deceleration of the wheel.

The hydraulic pump 16 consists of an eccentric cam 26 formed on the portion of the driving shaft 42 which is between the two bearings 40, 40'. A push rod 27 is disposed with its inner end opposed to the eccentric cam 26. A pump piston 28 is engaged with an outer end of the push rod 27. An operating piston 29 is engaged with an outer end of the pump piston 28, and a return spring 30 urges the push rod 27 in the direction in which the push rod 27 is removed from the eccentric cam 26.

The push rod 27 and pump piston 28 are fitted slidably in a first cylinder bore 33, which is formed in the casing body 22a. An inlet chamber 31 and an outlet chamber 32 are formed within the bore 33 on the outer side of the outer circumferential surfaces of the push rod 27 and the pump piston 28, respectively. A plug member 34 is fitted in an outer end portion of the first cylinder bore 33 so that a pump chamber 35 is formed between the plug member 34 and the pump piston 28. The operating piston 29 is fitted slidably in the plug member 34 so as to define a hydraulic chamber 36 therein.

The inlet chamber 31 is communicated with the oil tank R via the return pipe $L_2$, and with the pump chamber 35 via a suction valve 38. The pump chamber 35 is in communication with the outlet chamber 32 via a one-way seal member 39. The hydraulic chamber 36 is connected to the upstream pipe member $L_{1a}$ so as to be in constant communication with the output port Ma of the master cylinder M.

The modulator 17 consists of a vacuum piston 46, a fixed piston 47 adapted to receive one end of the vacuum piston 46 and limit the backward movement thereof, and a return spring 48 urging the vacuum piston 46 in the direction in which the vacuum piston 46 engages with the fixed piston 47. These pistons 46, 47 are fitted slidably and fixedly, respectively, in a second cylinder bore 52 adjacently to the first cylinder bore 33 in the casing body 22a.

In the second cylinder bore 52, the vacuum piston 46 defines a control hydraulic chamber 53 between itself and an inner end surface of the second cylinder bore 52, and an output hydraulic chamber 55 between the piston 46 and the fixed piston 47. The fixed piston 47 defines an input hydraulic chamber 54 on the outer side of the outer circumferential surface thereof. This input hydraulic chamber 54 is communicated with the hydraulic chamber 36 in the hydraulic pump 16 via an oil passage, and the output hydraulic chamber 55 is connected to the downstream pipe member $L_{1b}$ so as to communicate constantly with the input port $5_{1a}$ of the first brake caliper $5_1$. The control hydraulic chamber 53 is in communication with the outlet chamber 32 in the hydraulic pump 16 via an oil passage 57.

The fixed piston 47 is provided with a valve chamber 58 which is in constant communication with the input hydraulic chamber 54, and a valve port 59 communicating the valve chamber 58 with the output hydraulic chamber 55. The valve chamber 58 houses therein a valve body 60 capable of opening and closing the valve port 59, and a valve spring 61 urges the valve body 60 in the valve port-closing direction. A valve-opening rod 62 for pressing the valve body 60 in the valve port-opening direction projects from one end surface of the vacuum piston 46. This valve-opening rod 62 is adapted to keep the valve body 60 in a valve port-opening position when the vacuum piston 46 is in a rear limit position.

The outer opened portion of the second cylinder bore 52 is closed with an end plate 63 secured to the casing body 22a, and the fixed portion 47 is always kept in contact with the end plate 63 by the resilient force of the return spring 48 or the hydraulic pressures introduced into the input and output hydraulic chambers 54, 55.

The pressure discharge valve 20 consists of a valve seat member 65 fitted firmly in a stepped cylinder bore 64 in the casing body 22a, and a valve body 67 fitted slidably in the valve seat member 65 so as to open and close a valve port 66 thereof. The valve seat member 65 defines an inlet chamber 68 in a smaller-diameter portion of the stepped cylinder bore 64, and an outlet chamber 69 in a larger-diameter portion thereof. These two chambers 68, 69 are communicated with each other via the valve port 66. The inlet chamber 68 is in communication with the control hydraulic chamber 53 in the modulator 17 via an oil passage 70, and the outlet chamber 69 with the inlet chamber 31 in the hydraulic pump 16 via an oil passage 71. Consequently, the outlet chamber 69 is in communication with the oil tank R.

The sensor 21 for the angular deceleration of the wheel, which is provided in the sensor chamber 23, consists of a flywheel 72 supported rotatably and slidably on the driving shaft 42 via a bushing 86, a cam means 73 adapted to transmit the rotary torque of the driving shaft 42 to the flywheel 72 and convert the overrunning rotation of the flywheel 72 into the axial displacement thereof, and an output lever means 74 moved in accordance with the axial displacement of the flywheel 72 to operate the pressure discharge valve 20.

The cam means 73 consists of a driving cam member 82 mounted fixedly on the driving shaft 42, a driven cam member 83 disposed in opposition to and rotatably with respect to the driving cam member 82, and a thrust ball 84 engaged with cam recesses 82a, 83a formed in the opposite surfaces of the cam members 82, 83.

Figure 6:
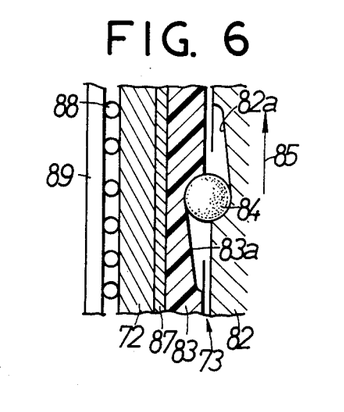
FIG. 6 is a cross-sectional view taken along line VI—VI of FIG. 4.

As shown in FIG. 6, the bottom surface of the cam recess 82a in the driving cam member 82 is inclined so that the recess 82a becomes more shallow in the rotational direction 85 of the driving shaft 42, and the bottom surface of the cam recess 83a in the driven cam member 83 is inclined so that the cam recess 82a becomes deeper in the rotational direction 85. Accordingly, in the normal case where the driving cam member 8 acts on the driven cam member 83, the thrust ball 84 is engaged with the deepest portions of the cam recesses 82a, 83a, and the rotary torque received from the driving shaft 42 is merely transmitted to the driven cam member 83 by the driving cam member 82 with no relative rotation occurring therein. Conversely, when the driven cam member 83 overruns the driving cam member 82, relative rotation occurs in these cam members 82, 83, and the thrust ball 84 rolls up along the inclined bottom surfaces of the cam recesses 82a, 83a to apply thrust to the two cam members 82, 83. Consequently, the driven cam member 82 is displaced axially, i.e., in the direction by which the driven cam member 82 is removed from the driving cam member 82.

The driven cam member 83 is supported rotatably on a hub 72a of the flywheel 72, and engaged with one side surface of the flywheel 72 via a friction clutch plate 87. A pressure plate 89 is attached to the other side surface of the flywheel 72 via a thrust bearing 88.

The output lever means 74 has a support shaft 90 projecting from the portion of the casing body 22a which is halfway between the driving shaft 42 and the pressure discharge valve 20. A lever 91 is supported on a free end portion of the support shaft 90 so that the lever 91 can be turned in the axial direction thereof. The lever 91 consists of a first longer arm 91a, which extends from the suppot shaft 90 while shunting the driving shaft 42, and a second shorter arm 91b extending from the support shaft 90 toward the pressure discharge valve 20. A contact portion 93, which is adapted to engage with the outer side surface of the pressure plate 89, is formed so as to project in the shape of a bump at an intermediate part of the first arm 91a.

A spring 94 is provided between the free end portion of the first arm 91 and the casing body 22a. The free end portion of the second arm 91b is engaged with the outer end of the valve body 67 in the pressure discharge valve 20.

The resilient force of the spring 94 works on the lever 91 to cause the contact portion 93 of the first arm 91a to be pressed against the pressure plate 89, and normally causes the valve body 67 in the pressure discharge valve 20 to be pressed and kept in a valve-closing state. The resistant force which the pressure plate 89 receives from the spring 94 causes a predetermined level of frictional locking force to be applied to the flywheel 72, friction clutch plate 87 and driven cam member 83, and the approaching force to be applied to the two cam members 82, 83.

This frictional locking force is set so that, when the rotary torque, the level of which is not lower than a predetermined level, is applied between the driven cam member 83 and the flywheel 72, slipping of the friction clutch plate 87 occurs.

A valve box 12 in the control valve V is attached to one side surface of the fork member Fr. The valve box 12 is provided with a smaller diameter cylindrical bore 13, and a larger diameter cylindrical bore 14 joined to one end of the cylindrical bore 13. One stepped piston 15 is fitted slidably in these cylindrical bores 13, 14 to thereby separate the larger diameter cylindrical bore 14 into an atmospheric pressure chamber 18 on the side of the smaller diameter cylindrical bore 13, and an input hydraulic chamber 19 on the opposite side thereof. An output hydraulic chamber 24 is formed in the smaller diameter cylindrical bore 13. The stepped piston 15 can be moved slidingly from its rear limit position, in which the piston 15 engages with a closed wall 14a of the larger diameter cylindrical bore 14, toward the smaller diameter cylindrical bore 13. this piston 15 is always urged toward the rear limit position by the force of a return spring 25 provided in the output hydraulic chamber 24. The stepped piston 15 is provided at a front end of a smaller diameter portion thereof with a cup seal 37, which prevents in the smaller diameter cylindrical bore 13 the output hydraulic chamber 24 and the atmospheric chamber 18 from being communicated with each other from the former chamber to the latter chamber, but which permits in the same bore 13 these chambers 24, 18 to be communicated with each other in the opposite direction, i.e., from the latter chamber to the former chamber. The stepped piston 15 is further provided on the outer circumferential surface of a larger diameter portion thereof with a seal ring 41, which prevents the input hydraulic chamber 19 and the atmospheric chamber 18 from communicating in the larger diameter cylindrical bore 14.

The upstream portion of the second downstream pipe member $L_{1c}$ is joined to the input hydraulic chamber 19, and the downstream portion of the downstream pipe member $L_{1c}$ and the return pipe $L_2$ via $L_3$ are joined to the output hydraulic chamber 24. A relief port 43, which is opened in the inner circumferential surface of the smaller diameter cylindrical bore 13 so as to communicate the return pipe $L_2$ via $L_3$ and output hydraulic chamber 24 with each other, is provided so that the relief port 43 is positioned immediately before the cup seal 37 when the stepped piston 15 is in the rear limit position.

The stepped piston 15 is provided with a valve port 44 by which the input and output hydraulic chambers 19, 24 are placed in communication, and a valve body 49 urged by a spring 45 so as to close the valve port 44. A valve-opening rod 50 capable of opening the valve body 49 when the stepped piston 15 is moved forward projects from a closed end wall 13a of the smaller diameter cylindrical bore 13.

The forward stroke length of the stepped piston 15 which moves until the valve body 49 has been opened is set to be larger than the stroke length of the same piston 15 moving until the cup seal 37 has passed the relief port 43.

The atmospheric chamber 18 is in communication at all times with the return pipe $L_2$ via a communication bore 51 so as not to hamper the reciprocating movement of the stepped piston 15.

The operation of this embodiment will now be described.

While the vehicle runs, the driving shaft 42 is overdriven by the front wheel W via the transmission gear 7, and then, the flywheel 72 is driven by the cam means 73 and friction clutch plate 87, so that the flywheel 72 is rotated at a higher speed than the front wheel W. Accordingly, the flywheel 72 has a large rotary intertial force.

At this time, the eccentric cam 26 in the hydraulic pump 16 is also rotated via the driving shaft 42.

When the master cylinder M is operated so as to brake the front wheel W, the output hydraulic pressure therefrom is first input into the first brake calipers $5_1$ via the upstream pipe member $L_{1a}$ of the hydraulic pipe $L_1$, the hydraulic chamber 36 in the hydraulic pump 16, the input hydraulic chamber 36 in the hydraulic pump 16, the input hydraulic chamber 54 in the modulator 17, the valve chamber 58, the valve port 59, the output hydraulic chamber 55, and the downstream pipe member $L_{1b}$ of the hydraulic pipe $L_1$ in the mentioned order to actuate the calipers $5_1$, so that the braking force can be applied to the front wheel W.

The output hydraulic pressure from the master cylinder M is also input into the input hydraulic chamber 19 in the control valve V via the downstream pipe member $L_{1b}$ and the second downstream pipe member $L_{1c}$. While this input hydraulic pressure is comparatively low, the stepped piston 15 is held in its rear limit position due to the force of the return spring 25. This keeps the valve body 49 closed. Therefore the transmission of pressure in the input hydraulic chamber 19 to the output hydraulic chamber 24 is prevented. Consequently, the second brake calipers $5_2$ are communicated with the oil tank R via the output hydraulic chamber 24, and in a non-operated state.

Figure 7:
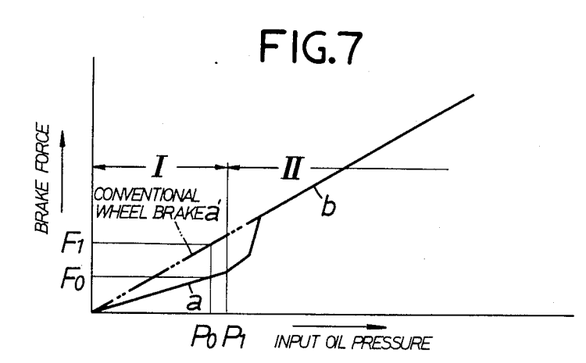
FIG. 7 is a characteristic curve for the braking force of the first embodiment.

The characteristics of the braking force in this condition are expressed by a straight line a in a region I in FIG. 7, and the gradient of the straight line a, i.e., a rate of increase in the braking force is comparatively low.

When the level of the output hydraulic pressure from the master cylinder M is increased so that the input hydraulic pressure into the wheel brake B has exceeded a predetermined level $P_1$, the forwardly-moving force of the stepped piston 15, resulting from the hydraulic pressure, overcomes a set load of the return spring 25 to advance the same piston 15. When the cup seal 37 has then passed the relief port 43, the valve body 49 is opened immediately by the valve-opening rod 50, and the hydraulic pressure in the hydraulic chamber 19 is inputted from the valve port 44 into the output hydraulic chamber 24 and then into the second brake calipers $5_2$ via the downstream portion of the second downstream pipe member $L_{1c}$ to acutate the same brake calipers $5_2$. As a result, the braking force is applied to the front wheel W by the cooperation of the two brake calipers $5_1$, $5_2$. Therefore, the braking force increases suddenly as shown by a straight line b in a region II in FIG. 7. Namely, the rate of increase in the braking force is substantially two times that shown in the region I.

On the other hand, in the hydraulic pump 16, in which an output hydraulic pressure from the master cylinder M is introduced into the hydraulic chamber 36, the pump piston 28 is moved reciprocatingly with the pressing force against the operating piston 29 due to this hydraulic pressure, and the lifting force of the eccentric cam 26 against the push rod 27. In a suction stroke, in which the pump piston 28 is moved toward the push rod 27, the suction valve 38 is opened, and the oil in the oil tank R is sucked from the pipe $L_2$ into the pump chamber 35 via the inlet chamber 31. In a discharge stroke, in which the pump piston 28 is moved toward the operating piston 29, the one-way seal member 39 is put in a valve-opening operation, and the oil in the pump chamber 35 is sent under pressure to the outlet chamber 32, and then to the control hydraulic chamber 53 in the modulator 17 via the oil passage 57. When the pressure in the outlet chamber 32 and the control hydraulic chamber 53 has increased to a predetermined level, the pump piston 28 is held in a position, in which the pump piston 28 engages with the plug member 34, due to the pressure in the outlet chamber 32.

The control hydraulic chamber 53 in the modulator 17 is initially shut off from the oil tank R since the pressure discharge valve 20 is closed. Accordingly, the hydraulic pressure supplied from the hydraulic pump 16 to the chamber 53 works directly on the vacuum piston 46 to press the same to the rear limit position, and keep the valve body 60 in an opened state by the valve-opening rod 62 allowing the passage of the output hydraulic pressure from the master cylinder M.

Therefore, in a normal braking operation, the braking force of the wheel brake B depends upon the output hydraulic pressure from the master cylider M.

When an angular deceleration occurs in the front wheel W in such a braking operation, the flywheel 72 senses the phenomenon and is urged by its inertial force in the direction in which the flywheel overcomes the driving shaft 42. During this time, the rotary moment of the flywheel 72 causes the cam members 82, 83 to be turned relatively to each other, and is displaced axially by the thrust occurring due to the rolling of the thrust ball 84, so that the pressure plate 89 is urged so as to press the lever 91. However, in the stage of a braking operation in which there is no possibility that the front wheel W is locked, the angular deceleration of the front wheel W is low, and the lever 91 is not turned.

When the front wheel W is beginning to lock due to an excessively large braking force or a decrease in the coefficient of friction of the road surface, the angular deceleration of the front wheel W increases suddenly, so that the pressing force of the pressure plate 89 exceeds a predetermined level. Consequently, the lever 91 is turned about the support shaft 90 as a fulcrum so as to compress the spring 94. As a result, the second arm 91b of the lever 91 is turned so that the arm 91b is removed from the valve body 67, so that the pressure discharge valve 20 is opened.

When the pressure discharge valve 20 has been opened, the hydraulic pressure in the control hydraulic chamber 53 is discharged into the oil tank R via the oil passage 70, inlet chamber 68, valve port 66, outlet chamber 69, oil passage 71, inlet chamber 31 in the hydraulic pump 16, and pipe $L_2$. Accordingly, the vacuum piston 46 is moved to the control hydraulic chamber 53 by the hydraulic pressure from the output hydraulic chamber 55 against the force of the return spring 48. Consequently, the valve-opening rod 62 is moved back to open the valve body 60 and shut off the input and output hydraulic chambers 54, 55 from each other, whereby the volume of the output hydraulic chamber increases. As a result, the input hydraulic pressure into the wheel brake B decreases to cause the braking force to decrease, so that the locking of the front wheel W can be prevented.

During this time, the pressure discharge valve 20 is fully opened so as to minimize the braking force, and the interior of the control hydraulic chamber 53 is made atmospheric. In spite of this fact, the vacuum piston 46 cannot be released from the pressing force of the return spring 48. Therefore, the hydraulic pressure based on the pressing force of the return spring 48 remains on the side of the output hydraulic chamber 55, i.e., as an input hydraulic pressure in the wheel brake B. If a large braking force of the wheel brake B due to this residual hydraulic pressure remains, the antilocking effect cannot be obtained in some cases on a road surface of a low coefficient of friction.

In this embodiment, a setting load of the return spring 25 in the control valve V is set so that the level $P_0$ of the residual hydraulic pressure mentioned above becomes equal to or lower than the working hydraulic pressure $P_1$ in the control valve V.

If the set load of the return spring 25 is thus set, the control valve V is not operated by the residual hydraulic pressure in the wheel brake B, and the second brake calipers $5_2$ are in a non-operated state. Accordingly, the braking force to be applied to the front wheel W of the wheel brake B can be reduced to $F_0$ in FIG. 7 in a satisfactory manner to enable the anti-locking performance to be improved.

If the second brake calipers $5_2$ are still operated, the characteristics of the braking force are expressed by an extension line a and the line b of FIG. 7. It may be understood that the braking force $F_1$ based on the residual hydraulic pressure $P_0$ in this case increases substantially two times the previously-mentioned braking force $F_0$.

With modulation, the front wheel W, the locking of which can thus be prevented, is accelerated to cause the pressure plate 89 to be released from the pressing force by which the pressure plate 89 is urged against the lever 91. Consequently, the lever 91 is turned backward to its original position owing to the resilient force of the spring 94 to close the pressure discharge valve 20. When the pressure discharge valve 20 has been closed, the pressure oil discharged from the hydraulic pump 16 is trapped immediately in the control hydraulic chamber 53, and the vacuum piston 46 is moved back toward the output hydraulic chamber 55 to increase the pressure therein and thereby regain the normal braking force. Such operations are repeated at a high speed so as to brake the front wheel W with a high efficiency.

Figure 8:
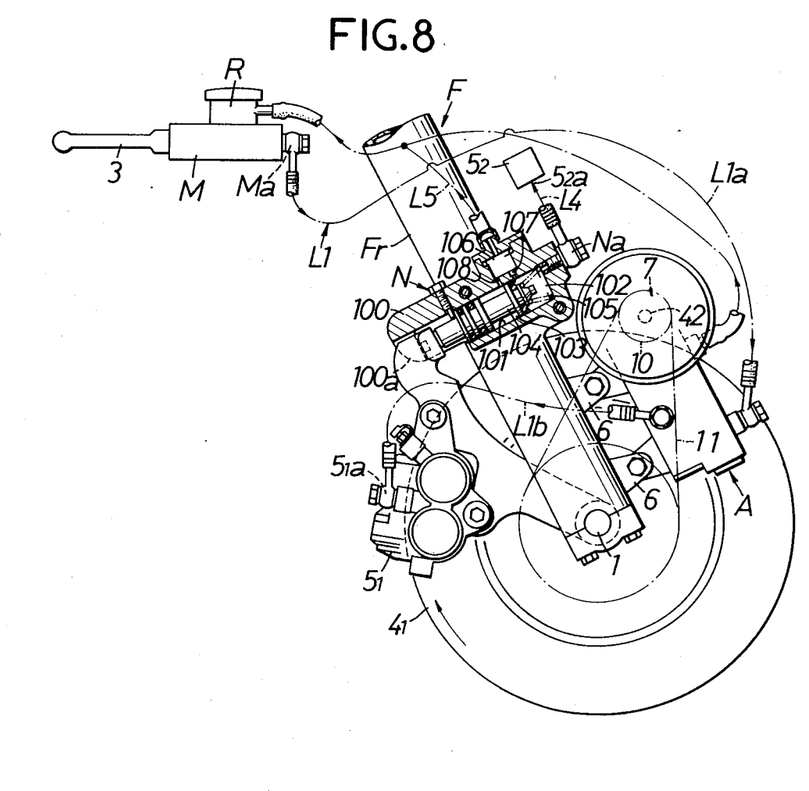
FIG. 8 is a sectional side elevation of a second embodiment of the present invention.

A second embodiment of the present invention will now be described with reference to FIG. 8.

The first brake calipers $5_1$ in a wheel brake B are supported pivotably on an axle 1 so that the first calipers $5_1$ can be turned while they are in operation about the axle 1 by the reaction force of the braking torque applied to a first brake disc $4_1$. A relay master cylinder N which is operated by the braking reaction force of the first brake calipers $5_1$ is attached to a front fork F. A hydraulic pipe $L_4$ communicates an output port Na of the relay master cylinder N and an input port $5_{2a}$ of second brake calipers 5 with each other.

The construction of the relay master cylinder N is basically identical with that of a regular master cylinder M. The construction of the relay master cylinder N will now be briefly described. The relay master cylinder N has main constructional elements of a cylinder body 100 fixed to the front fork F, a piston 104 fitted slidably in a cylindrical bore 101 in the cylinder body 100 to separate the interior thereof into a hydraulic chamber 102 and an oil feed chamber 103, and a return spring 105 housed in the hydraulic chamber 102 and urging the piston 104 resiliently in the rearward direction, i.e., toward the oil feed chamber 103. The piston 104 is connected at its rear end to the first brake calipes $5_1$ so that the piston 104 can be moved forward by the braking reaction force of the first brake calipers $5_1$, and a retainer claw 100a for use in maintaining this connected state of the piston 104 projects from the rear end of the cylinder body 100. The hydraulic chamber 102 is communicated with the output port Na.

In the cylinder body 100, an oil reserving chamber 106 is formed, which is communicated with the hydraulic chamber 102 and oil feed chamber 103 via a relief port 107 and a supply port 108, respectively, and with an oil tank R via a pipe $L_5$. The construction of the remaining portions of this embodiment is identical with that of the corresponding portions of the previously-described embodiment. The parts of the embodiment of FIG. 8 which correspond to those of the previous embodiment art designated by the same reference numerals or letters.

When the first brake calipers $5_1$ are actuated by output hydraulic pressure from the master cylinder M, to apply the braking force to the front wheel W via the first brake disc $5_1$ for carrying out a braking operation, the first brake calipers $5_1$ are urged by the reaction force of the braking force so as to turn araound the axle 1 and advance the piston 104 in the relay master cylinder N. However, when this pivotal torque in the brake calipers $5_1$ is lower than that applied to the same brake calipers $5_1$ in the opposite direction by the force of the return spring 105, the piston 104 is not moved from its position of retirement, and the second brake calipers $5_2$ are not operated. The braking force in this condition is comparatively small as shown by the line a in the region I in FIG. 9.

Figure 9:
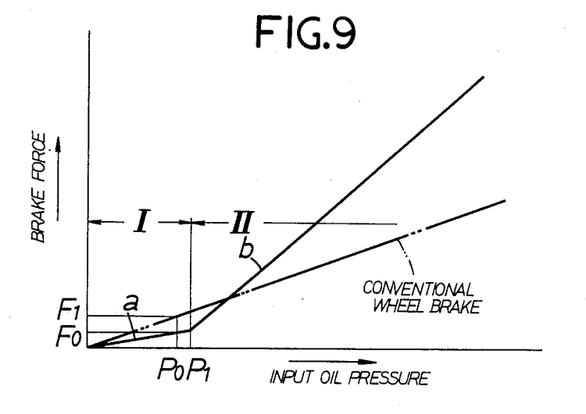
FIG. 9 is a characteristic curve of the braking force of the second embodiment of the present invention.

When the output hydraulic pressure from the master cylinder M has increased to cause the braking force of the first brake calipers $5_1$ to increase, so that the pivotal torque of the brake calipers $5_1$ due to the braking reaction force has exceeded that in the opposite direction and due to the force of the return spring 105, the piston 104 is pressed forward by the first brake calipers $5_1$ against the force of the return spring 105. When the piston 104 has passed the relief port 107, a hydraulic pressure is input from the output port Na into the second brake calipers $5_2$ via a hydraulic pipe $L_4$ to actuate the same brake calipers $5_2$. Consequently, the first and second brake calipers $5_1$, $5_2$ are operated cooperatively so that the braking force increases suddenly as shown by the line b in the region II.

In this embodiment, a setting load of the return spring 105 is set so that, during an operation for decelerating the antilocking control unit A, the level $P_0$ of the residual hydraulic pressure in the first brake calipers $5_1$ is equal to or lower than that $P_1$ of the input hydraulic pressure, by which the relay maste cylinder N is actuated, in the first brake calipers $5_1$.

Therefore, in this embodiment, the second brake calipers $5_2$ are not operated by the residual hydraulic pressure in the first brake calipers $5_1$ during a pressure-reducing operation of the antilock control unit A. Hence, the braking force can be reduced sufficiently, and excellent antilock performance can be obtained.

Even if one brake disc is provided instead of the first and second brake discs $4_1$, $4_2$ in each of the above embodiments with the first and second brake calipers $5_1$, $5_2$ set on different circumferential portions thereof, the same effect can be obtained.

The wheel brake is formed so that the range of increase in the braking force with respect to the input hydraulic pressure is low when the input hydraulic pressure is lower than the level of a residual hydraulic pressure in the wheel brake during a pressure-reducing operation of the modulator, and high when the input hydraulic pressure in not lower than the mentioned level. Therefore, during a pressure reducing operation of the modulator, the braking force of the wheel brake can be reduced sufficiently in spite of the residual hydraulic pressure therein, so that excellent antilock performance can be displayed. Moreover, during a normal braking operation, the wheel brake can be operated very effectively, the braking operation can be carried out lightly.

What is claimed is:

1. A braking system for the wheel of a vehicle, comprising
a brake having two brake calipers;
a master cylinder;
hydraulic coupling between said two brake calipers and said master cylinder;
an antilock modulator assembly in said hydraulic coupling and having a hydraulic chamber and a first spring biased piston therein creating a residual pressure in said hydraulic coupling during modulation;
a valve in said hydraulic coupling to one of said brake calipers, said valve having an output hydraulic chamber, a second spring biased valve piston therein and a relief port controlled by said second valve piston, said second spring biased valve piston closing said relief port at a hydraulic pressure in said hydraulic coupling above said residual pressure.

2. A braking system for the wheel of a vehicle, comprising
a brake having first and second brake calipers;
a master cylinder;
hydraulic coupling between said master cylinder and said first brake caliper;
an antilock modulator assembly in said hydraulic coupling and having a hydraulic chamber and a first spring biased piston therein creating a residual pressure in said hydraulic coupling during modulation;
a second master cylinder hydraulically coupled with said second brake caliper and actuated by braking reaction forces on said first brake caliper, said second master cylinder having an output hydraulic chamber, a second spring biased valve piston therein and a relief port controlled by said second valve piston, said second spring biased valve piston closing said relief port when the hydraulic pressure in said hydraulic coupling is above said residual pressure.

3. A braking system for a vehicle wheel, comprising:
a master cylinder;
a brake connected via hydraulic coupling with said master cylinder and capable of applying a braking force to the wheel of a vehicle in accordance with a hydraulic pressure outputted from said master cylinder;
a sensor adapted to generate a deceleration signal by sensing that said wheel is about to be locked; and
a modulator disposed in said hydraulic coupling and operable, upon receipt of the deceleration signal from the sensor, to reduce a hydraulic pressure to be inputted to said brake;
wherein during modulation by said modulator, a certail level of residual hydraulic pressure remains in said brake, and
wherein the brake is constructed such that the braking force is applied to said wheel at a smaller ratio to the inputted hydraulic pressure when the inputted hydraulic pressure is not at more than a predetermined level equal to or slightly higher than the level of said residual pressure while said ratio becomes larger when the inputted hydraulic pressure exceeds said predetermined level.

4. A braking system for a vehicle wheel, comprising:
a brake having two brake calipers for said wheel;
a master cylinder;
hydraulic coupling between at least one of said two brake calipers and said master cylinder; and
an antilock modulator assembly disposed in said hydraulic coupling and adapted to modulate a hydraulic pressure to be inputted from the master cylinder to said brake for actuation thereof, said assembly permitting a residual pressure of certain level in said hydraulic coupling during modulation;
wherein in a first range where the input hydraulic pressure is at not more than a predetermined level equal to or slightly higher than that of said residual pressure, only one of the two brake calipers is operative to apply a braking force to said wheel and the other caliper is in inoperative state, while in a second range where the input hydraulic pressure exceeds said predetermined level, both the two calipers are made operative and are capable of applying braking forces to said wheel.

5. A braking system according to claim 4, wherein said hydraulic coupling is branched into two parts downstream of said antilock modulator assembly, these parts respectively leading to the two brake calipers and a valve being interposed in one of the hydraulic coupling parts for the other brake caliper, said valve being open, when the hydraulic pressure in said one hydraulic coupling part increases to said predetermined level, to allow the pressure to be supplied to the other caliper.

6. A braking system according to claim 4, wherein a relay master cylinder is additionally provided and is connected to said other brake caliper via another hydraulic coupling, said one brake caliper having a member associated with said relay master cylinder, said member being responsive to a reaction force above a set level applied to the one caliper when it gives a braking action to the vehicle wheel, thereby to cause said relay master cylinder to generate and feed a hydraulic actuation pressure to said other brake caliper.

7. A braking system according to claim 6, wherein said member also serves as a supporting means for supporting said one caliper to a vehicle body, said member being pivotable at one end thereof around an axle of the wheel and being placed at a part thereof remote from said one end in abutting engagement with an actuating piston of said relay master cylinder so as to urge the piston toward a pressure generating position.

8. A braking system according to claim 7, wherein said member urges the piston substantially in a direction of normal rotation of the wheel.

9. A braking system according to claim 4 wherein said antilock modulator having a hydraulic chamber and a first spring biased piston therein creating the residual pressure.

10. A braking system according to claim 4 further comprising:
    a valve in said hydraulic coupling to one of said brake calipers, said valve having an output hydraulic chamber, a second spring biased valve piston therein and a relief port controlled by said second valve piston, said second spring biased valve piston closing said relief port at a hydraulic pressure in said hydraulic coupling above said residual pressure.

11. A braking system according to claim 6 wherein said relay master cylinder comprises:
    an output hydraulic chamber, a second spring biased valve piston, and a relief port controlled by said second spring biased valve piston, said second spring biased valve piston closing said relief port when the hydraulic pressure in said hydraulic coupling is above said residual pressure.

* * * * *